United States Patent
Fernandes et al.

(10) Patent No.: US 11,864,057 B2
(45) Date of Patent: Jan. 2, 2024

(54) LOCATION DETERMINATION BASED ON HISTORICAL SERVICE DATA

(71) Applicant: Uber Technologies, Inc., San Francisco, CA (US)

(72) Inventors: Neil Fernandes, San Francisco, CA (US); Shivendra Pratap Singh, Redwood City, CA (US); Krishna Aditya Gabbita, San Mateo, CA (US); Aditya Somani, Ajmer (IN)

(73) Assignee: UBER TECHNOLOGIES, INC., San Francisco, CA (US)

( * ) Notice: Subject to any disclaimer, the term of this patent is extended or adjusted under 35 U.S.C. 154(b) by 404 days.

(21) Appl. No.: 17/165,740

(22) Filed: Feb. 2, 2021

(65) Prior Publication Data

US 2022/0109952 A1    Apr. 7, 2022

Related U.S. Application Data

(60) Provisional application No. 63/088,334, filed on Oct. 6, 2020.

(51) Int. Cl.
| | |
|---|---|
| H04W 4/029 | (2018.01) |
| G06Q 50/30 | (2012.01) |
| G08G 1/00 | (2006.01) |
| G01C 21/34 | (2006.01) |

(52) U.S. Cl.
CPC ........ *H04W 4/029* (2018.02); *G01C 21/3438* (2013.01); *G01C 21/3492* (2013.01); *G06Q 50/30* (2013.01); *G08G 1/202* (2013.01)

(58) Field of Classification Search
None
See application file for complete search history.

(56) References Cited

U.S. PATENT DOCUMENTS

| | | | | |
|---|---|---|---|---|
| 2020/0042885 | A1* | 2/2020 | Zhong | G06N 5/022 |
| 2020/0141741 | A1* | 5/2020 | Wang | G01C 21/343 |
| 2020/0408552 | A1* | 12/2020 | Yuan | G01C 21/3807 |
| 2021/0140774 | A1* | 5/2021 | Zhao | G06N 5/04 |

* cited by examiner

*Primary Examiner* — Adolf Dsouza

(74) *Attorney, Agent, or Firm* — Fenwick & West LLP

(57) ABSTRACT

A network system receives a service request sent from a computing device of a user. The service request identifies a service to be provided by a provider and a service request location. In response to receiving the service request, the network system identifies a plurality of candidate locations. The network system selects the location from a plurality of candidate locations according to predetermined criteria including a frequency measurement of each candidate location. The network system replaces the service request location with the selected location. The network system sends the selected location to the computing device. Responsive to receiving an acceptance of the selected location from the computing device, the network system generates navigation instructions for the provider from a current location of the provider to the selected location.

20 Claims, 4 Drawing Sheets

LOCATION DETERMINATION BASED ON HISTORICAL SERVICE DATA

CROSS REFERENCE TO RELATED APPLICATIONS

This application claims the benefit of U.S. Provisional Application No. 63/088,334, filed on Oct. 6, 2020, which is incorporated herein by reference in its entirety.

BACKGROUND

The described embodiments generally relate to providing a service for a user at a location, and, more particularly, to determining the location for providing the service based on historical service data of the user and historical service data of other users.

Network systems, such as service request management systems, provide support for logistical issues in managing a service request (e.g., transportation of people and/or cargo). In some systems, a provider provides transportation services to a user from and to locations (e.g., from an origin location and to a destination location) specified by the user. Typically, the locations identified by the user do not accurately portray the actual locations where the user wants the services to be rendered. This may lead to inefficiencies providing the service to the user. Users and providers must then coordinate new locations, causing frustration to the parties and further delaying the service to be provided.

SUMMARY

A network system, such as a service request management system, determines a location related to a service request sent from a computing device of a user. The service request includes a service to be provided by a provider and at least one service request location. In some embodiments, the service request may include a service request time. The service request location(s) of the service request may include an origin location and/or a destination location. In one example, the service to be provided may be to transport a user from the origin location to the destination location. In another example, the service to be provided may be to deliver one or more items to the user at a destination location. In some cases, the service request location may not be the exact location where the user intends for the service to be provided. For example, a service request may include the following: a request for transportation service and two service request locations (e.g., an origin location of Uber Headquarters and a destination location of Golden Gate Park in San Francisco). In this example, the service request location (Golden Gate Park) does not provide the provider with enough information to determine the exact location where the user intends for the service to be provided (where the user wants to be transported to). Thus, to provide a better experience for both the user and the provider, the system determines a location for providing the service that is more specific and allows for the service to be provided more efficiently.

In response to receiving the service request from the user, the system identifies a plurality of candidate locations related to the service request location(s). The plurality of candidate locations is based on a set of historical service data associated with the user and/or a set of historical service data associated with a plurality of other users of the system. The historical service data may include historical service locations, historical service times, frequency measurements associated with historical service locations, recency measurements associated with historical service locations, an amount of successful service requests that take place at the historical service location, an amount of unsuccessful service requests that take place at the service request location provided by the user, and feedback regarding previous service requests provided by the user or provided by the plurality of other users.

In one embodiment, the plurality of candidate locations are identified by comparing the service request location to a listing of historical service locations in the set of historical service data of the user and a listing of historical service locations in the set of historical service data of the plurality of other users of the network system. The comparison may include the system performing a distance comparison and identifying candidate locations as those of the historical service locations for which the distance to the service request location is below a threshold. Alternatively, the comparison may include the system comparing the service request location and the service request time to a listing of historical service locations and associated historical service times in the set of historical service data of the user and to a listing of historical service locations and associated historical service times in the set of historical service data of the plurality of other users of the network system. In this embodiment, the plurality of candidate locations may be those of the historical service locations for which the distance to the service request location is below a threshold distance and the historical service time is within a threshold amount of time of the service request time.

The system, in some embodiments, ranks the identified candidate locations based on predetermined criteria, such as frequency, recency, distance between the candidate location and the service request location, the amount of successful service requests that take place at the identified candidate location, the amount of unsuccessful service requests that take place at the service request location provided by the user, feedback provided by the user, and/or feedback provided by other users. The system determines to replace the service request location of the service request with one of the candidate locations based on the ranking.

The selected candidate location is sent to the computing device for acceptance from the user. Responsive to the system receiving the acceptance from the user, the system generates navigation instructions for the provider from a current location of the provider to the selected location. The provider provides the service at the selected location.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
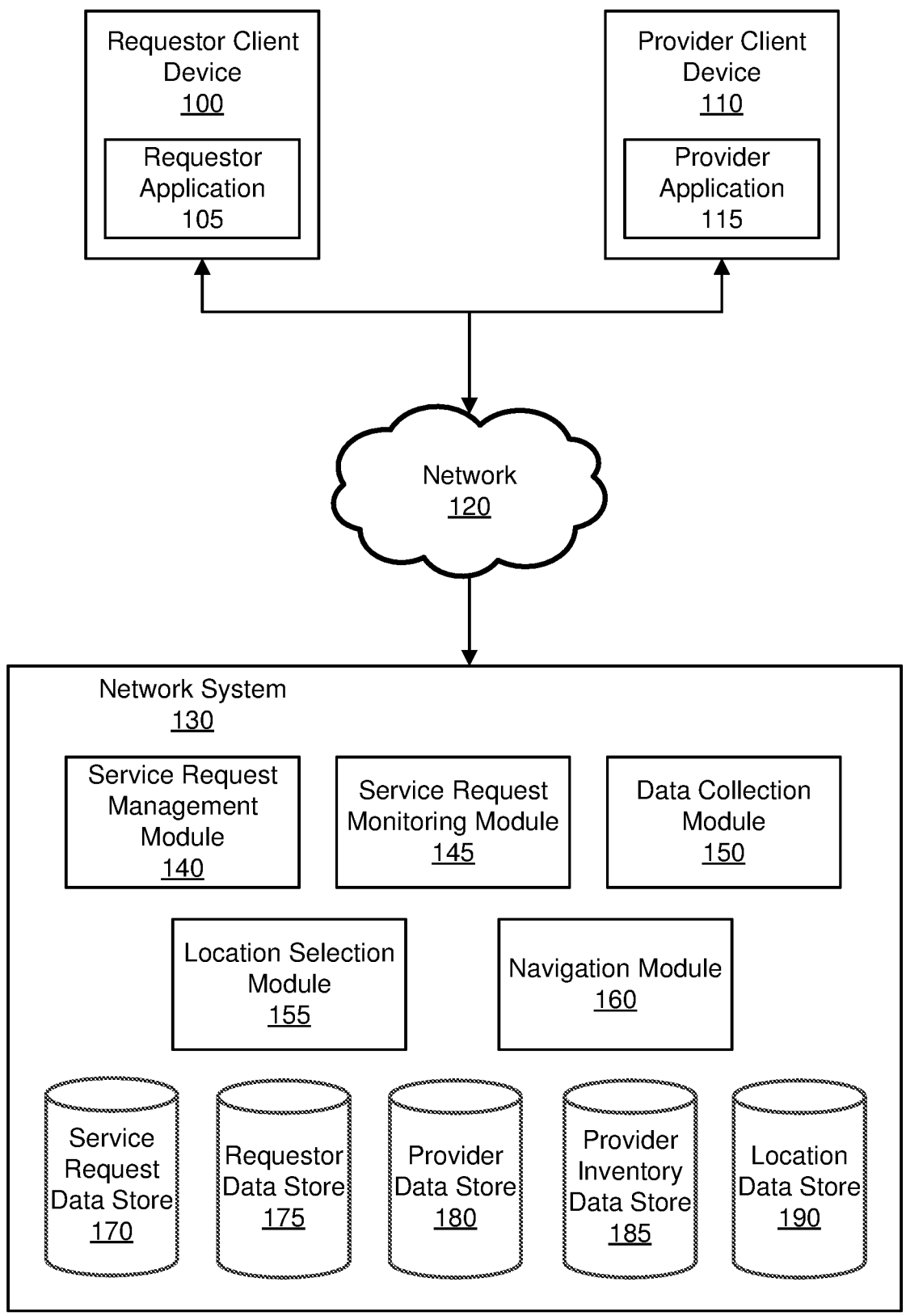
FIG. 1 illustrates a system environment for processing service requests, in accordance with an embodiment.

Turning now to the specifics of the system architecture, FIG. 1 illustrates a system environment for processing service requests, in accordance with an embodiment. The illustrated system environment includes a requestor client device 100, a provider client device 110, a network 120, and a network system 130. In alternate embodiments, the functionality of each component may be distributed differently from the examples described herein, and the system environment may include more, fewer, or different components than illustrated in FIG. 1. For example, the system environment may include more than one requestor client device 100 or provider client device 110 connected to the network system 130.

A requestor (i.e., a user of the network system) operates a requestor client device 100 that executes a requestor application 105 that communicates with the network system 130 via a network 120. The requestor operates the requestor application 105 to view information about the network system 130, and to make a service request from the network system 130. The service request may identify a service to be provided and at least one service request location. The requestor application 105 enables the requestor to specify the service and the at least one service request locations. For example, the requestor may use the requestor application 105 to request a transportation service with the provider transporting the requestor (and, optionally additional persons) from a first service request location (e.g., an origin location) to a second service request location (e.g., a destination location). In another example, the requestor uses the requestor application 105 to make a service request which includes a request for delivery service with the provider delivering one or more items to the requestor at a service request location (e.g., a destination location).

In some embodiments, a service request location may correspond to a current location of the requestor client device 100 as determined automatically by a location determination module (not shown) in the requestor client device 100, e.g., a global positioning system (GPS) component, a wireless networking system, or a combination thereof. For purposes of simplicity, as described herein, a service request location can be (i) determined by the requestor application 105 (e.g., based on the current location of the requestor client device 100 using a GPS component) or (ii) specified or selected by the requestor. In some embodiments, the network system 130 replaces one or more service request locations with a replacement location based on historical service data, as discussed below.

The service request can also include a service request time. The service request time may include a specific time at which the service is desired and/or an earliest time that the service can be provided. For example, the requestor requests to have a food order delivered to their house (the service request location) by 5:30 PM (the service request time).

According to examples herein, the requestor client device 100 can transmit a set of data (e.g., referred to herein as "service data") to the network system 130 over the network 120 in response to requestor input or operation of the requestor application 105. The service data can include a service request. Such service data can be indicative of the requestor's interest in potentially requesting service (e.g., before actually confirming or submitting the service request). For example, the requestor may launch the requestor application 105 and specify a service and a service request location to view information about the service request before making a decision on whether to request service. For example, the requestor may want to view information about the average or estimated time of arrival of the provider at a service request location, a price for the provider to complete the service request, the available service types (e.g., vehicle type), etc. Depending on implementation, the service data can also include requestor information (e.g., an identifier), requestor application 105 information (e.g., version number), requestor client device 100 identifier or type, a payment profile identifier, and/or other data. According to some examples, each time the requestor modifies one or more of the requested service, the service request locations, and/or the service request times, the requestor application 105 can generate and transmit the service data to the network system 130.

Once the requestor submits their service request via the requestor application 105, the requestor application 105 can generate data corresponding to the service request through the network system 130. Responsive to receiving the service request, the network system 130 uses information from the service request, a set of historical service data associated with the requestor, and a set of historical service data associated with a plurality of other users of the network system to select a replacement location for a service request location. The network system 130 can replace the service request location with a more accurate location and provide the location to the requestor for approval via the requestor application 105. The requestor can accept the location and the network system 130 selects a provider from a set of providers to provide the service for the requestor. Responsive to selecting an available provider, the network system 130 sends an invitation message to the provider client device 110 inviting the provider to fulfill the service request.

The provider (i.e., another user of the network system 130) operates a provider client device 110 executing a provider application 115 that communicates with the network system 130 to provide information indicating whether the provider is available or unavailable to provide a service to a requestor. The provider application 115 can also present information about the network system 130 to the provider, such as invitations to provide service, navigation instructions, map data, etc. In one embodiment, the provider application 115 enables the provider to provide information regarding availability of the provider by logging into the network system 130 and activating a setting indicating that they are currently available to provide service. The provider application 115 also provides the current location of the provider or the provider client device 110 to the network system 130. Depending on implementation, the current location may be a location inputted by the provider or may correspond to the current location of the provider client device 110 as determined automatically by a location determination module (not shown) in the provider client device 110 (e.g., a GPS component, a wireless networking system, or a combination thereof).

In some embodiments, the provider application 115 allows a provider to receive, from the service request management module 140, an invitation message to provide a service for a requestor, and if the provider accepts via input, the provider application 115 can transmit an acceptance message to the service request management module 140. The service request management module 140 can subsequently provide information (e.g., estimated time of arrival) about the provider to the requestor application 105. In other embodiments, the provider application 115 can enable the provider to view a list of current service requests and to select a particular service request to fulfill. The provider application 115 can also receive navigation instructions from the service request management module 140. The provider application 115 enables a provider to provide a rating for a requestor upon completion of a service request. In one embodiment, the rating is provided on a scale of one to five, five being the maximal (best) rating.

The requestor client device 100 and the provider client device 110 are portable electronic devices such as smartphones, tablet devices, wearable computing devices (e.g., smartwatches) or similar devices. Alternatively, the provider client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The requestor client device 100 and the provider client device 110 interact with the network system 130 via the network 120 through client applications 105, 115 configured to interact with the network system 130. The applications 105 and 115 of the requestor client device 100 and the provider client device 110, respectively, can present information (e.g., a map of the geographic region, a current location of the requestor client device 100 or the provider client device 110) received from the network system 130 on an interface. The applications 105 and 115 running on the requestor client device 100 and the provider client device 110 can determine the current location of the device and provide the current location to the network system 130.

The requestor client device 100 and the provider client device 110 can communicate with the network system 130 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

FIG. 1 further illustrates an example system architecture for the network system 130, in accordance with an embodiment. In some embodiments, the network system 130 coordinates the transportation of persons for a service requestor by a provider. In some embodiments, the network system 130 coordinates the transportation and delivery of one or more items for the requestor by the provider. In the embodiment illustrated in FIG. 1, the network system 130 includes a service request management module 140, a service request monitoring module 145, a data collection module 150, a location selection module 155, a navigation module 160, and various data stores including a service request data store 170, a requestor data store 175, a provider data store 180, a provider inventory data store 185, and a location data store 190. In some embodiments, these modules and data stores may not be native components of a generic computer system and may provide structures and functions beyond generic functions of a computer system, as further described below. In other embodiments, these modules and data stores may be native components. Alternate embodiments may include more, fewer, or different modules form those illustrated in FIG. 1, and the functionality of the modules may be distributed differently from the description herein.

The service request management module 140 is configured as a communicative interface between the requestor application 105, the provider application 115, and the various modules and data stores in the network system 130, and is one means for performing this function. In some embodiments, the service request management module 140 is also configured to receive service requests from the requestor application 105 and creates corresponding service request records in the service request data store 170. According to an example, a service request record corresponding to a service request can include or be associated with a service request ID, a requestor ID, one or more service request locations (e.g., an origin location and/or a destination location) entered by the requestor, one or more replacement locations (e.g., determined by the location selection module 155), a service request time, a service type, pricing information, and/or a status indicating that the corresponding service request has not been processed.

The service request management module 140 is also configured to receive provider information such as availability status information, current location information, and information regarding a completion of a service request from the provider application 115. The service request management module 140 may store some or all of the provider information in the provider inventory data store 185. According to one example, when a provider accepts the invitation message to complete the service request for the requestor, the service request record in the service request data store 170 can be updated with the provider's information as well as the provider's location and a time when the service request was accepted. The service request management module 140 is also configured to receive confirmation regarding one or more replacement locations (i.e., locations to replace the entered service request locations) from a requestor via the requestor application 105.

The service request monitoring module 145 is configured to receive information (e.g., periodically) from the provider application 115 indicating the location of the provider's vehicle and/or telematics information (e.g., indications of current speed, acceleration/deceleration, events, stops, and so forth). In some embodiments, the service request monitoring module 145 receives a confirmation (i.e., a type of feedback) from the provider application 115 indicating a successful completion of the service request. For example, a provider delivers a food item to a requestor and confirms via the provider application 115 completion of the service request. In this embodiment, the confirmation of the completion of the service request may be associated with the current location of the provider providing information that a successful service request took place at that particular location. In some embodiments, the service request monitoring module 145 receives information indicating an unsuccessful service request took place at the service request location provided by the requestor. For example, the provider may attempt to transport the requestor to a destination location that is adjacent to a bus stand and have to re-adjust the destination location in real-time. In this example, the service request monitoring module 145 may receive notification (i.e., another type of feedback) via the provider application 115 that the service request is completed at a different destination location than the requestor-entered service request location. The service request monitoring module 145 stores the information received from the provider application 115 in the service request data store 170 and can associate the information with the service request record. In some embodiments, the service request monitoring module 145 periodically calculates the provider's estimated time of arrival (ETA) at a service request location or a location that replaces the service request location and provides the ETA to the requestor application 105.

The data collection module 150 collects and aggregates historical service data associated with the requestor and historical service data associated with other users of the network system 130. Other users of the network system 130 may include other requestors utilizing the network system 130. In some embodiments, historical service data is extracted from the service request records stored in the service request data store 170. For example, the one or more service request locations and corresponding service request times are extracted from the service request data store 170. The data collection module 150 aggregates the data regarding past service requests submitted by the requestor and by other users of the network system 130 into historical service data.

The historical service data can include, for example, historical service locations, a historical service time associated with the historical service locations, a frequency measurement with which historical service locations have been used, a recency measurement with which historical service locations have been used, an amount of successful service requests that take place at the historical service location, an amount of unsuccessful service requests that take place at the service request location provided by the requestor, and feedback from requestors and/or providers. The historical service locations can include service request locations provided by the requestor and/or replacement locations determined by the location selection module 155. The historical request time associated with the historical service location are provided by the requestor in the service request. In some circumstances, a frequency measurement can be a number of times the historical service location has been used by the requestor or by the other users of the network system 130. In one instance, the frequency measurement may be a number of times the historical service location was used in the past month, three months, year, two years, or some other length of time. The recency measurement can be a number ranking describing which historical service locations have been used most recent. For example, the recency measurement may be a particular number (e.g., a one) if the historical service location was used in the last month, a different number (e.g., a two) if the historical service location was used in the month prior to the last month, and so on. The amount of successful service requests that take place at the historical service location may be a number of times the historical service location was used in a successfully completed service request. The amount of unsuccessful service requests that take place at the service request location may be a number of times the service request location identified by the requestor was used in an unsuccessful service request. Successful and/or unsuccessful service requests may be determined based on requestor and/or provider feedback.

The data collection module 150 can solicit feedback from a requestor and/or a provider after a service request is completed via the requestor application 105 and/or the provider application 115, including whether the service request location or replacement location was a suitable location. For example, a requestor might provide feedback related to a service request that specifies the replacement location was not suitable because it was in front of a bus stop or a taxi stand. In another example, a provider might provide feedback related to a service request that specifies the service request location (e.g., a destination location) was not suitable because the service request location encompassed too large an area for the provider to determine exactly where to deliver an item to the requestor in a timely fashion. The data collection module 150 can store the feedback in the corresponding service request records stored in the service request data store 170. The data collection module 150 aggregates the feedback into the historical service data.

The data collection module 150 provides the aggregated historical service data associated with the requestor and the aggregated historical service data associated with the other users of the network system 130 to the location data store 190. In one embodiment, the data collection module 150 periodically queries the service request data store 170 for additional service request records and updates the aggregated historical service data accordingly.

The location selection module 155 identifies a plurality of candidate locations based on the service request, the set of historical service data associated with the requestor, and the set of historical service data associated with other users of the network system 130. Responsive to receiving a service request including at least one service request location, the service request management module 140 sends an instruction to the location selection module 155 to identify the candidate locations as potential replacement locations for at least one service request location. In some embodiments, the candidate locations may include the service request location provided by the requestor in the service request.

The location selection module 155 queries the location data store 190 for historical service locations and filters the historical service locations to include candidate locations within a threshold distance to the service request location entered by the requestor. For example, the location selection module 155 determines an amount of distance between the service request location and each historical service location. The location selection module 155 can compare the amounts of distance to a threshold distance amount (e.g., 50 meters, 100 meters, 150 meters, 200 meters, etc.). The threshold distance amount can be an amount entered by the requestor via the requestor application 105 (i.e., the threshold distance is a distance the requestor is willing to adjust the service request location by). The historical service locations are determined to be candidate locations by the location selection module 155 if the historical service location is within the threshold distance amount of the service request location.

Additionally, the location selection module 155 can query the location data store 190 for historical service times associated with the candidate locations determined to be within the threshold distance amount. The location selection module 155 updates the candidate locations to include candidate locations associated with historical service times within a threshold amount of time to the service request time entered by the requestor. For example, the location selection module 155 determines an amount of time between the service request time and the historical service time associated with the candidate locations. The location selection module 155 can compare the amounts of time to the threshold time amount (e.g., 5 minutes, 10 minutes, 15 minutes, etc.). The candidate locations can be updated by the location selection module 155 based on the amount of time associated with each candidate location being below the threshold time amount.

The location selection module 155 can receive the corresponding historical service data from the location data store 190 for the candidate locations. The location selection module 155 can select a location from the candidate locations to replace a service request location according to predetermined criteria. The predetermined criteria can include a frequency measurement of the candidate location, a distance measurement between the candidate location and the service request location, a recency measurement for the candidate location, an amount of successful service requests that took place at the candidate location, an amount of unsuccessful service requests that took place at the candidate location, or any feedback provided by the requestor and/or the provider associated with the candidate locations.

The location selection module 155 can use machine learning techniques to train a model configured to determine the location to replace a service request location. The model can determine a rank score for the candidate locations based on the predetermined criteria. For example, the model may determine a higher rank score for a candidate location with the highest frequency measurement (i.e., the most frequently used location). In another example, the model may determine a lower rank score for a candidate location with a greater distance measurement between it and the service request location. In another example, the model can determine a lower rank score for a candidate location not recently used (e.g., based on the recency measurement). In another example, a candidate location may receive a higher-ranking score if the candidate location is associated with a high amount of successful service requests taking place at the candidate location. In another example, the model can determine a lower rank score for a candidate location with a high amount of unsuccessful service requests taking place at the candidate location. A candidate location can receive a higher-ranking score if the candidate location has received a majority of positive feedback. In some embodiments, candidate locations selected based on historical service data associated with the requestor may receive a higher rank score than candidate locations selected based on historical service data associated with other users of the network system 130.

The location selection module 155 then ranks the candidate locations based on the ranking scores and selects the top ranked candidate location as a replacement location for the service request location. In some embodiments, the location selection module 155 sends the selected location to the requestor client device 100. In another embodiment, the location selection module 155 sends multiple highly ranked candidate locations to the requestor client device 100 allowing the requestor to select the replacement location from among the presented candidates.

The navigation module 160 can generate navigation instructions from the provider's current location to the selected location. Upon receiving a confirmation (i.e., an acceptance) from the requestor via the requestor application 105, the service request management module 140 provides instructions to the navigation module 160 to generate the navigation instructions to the replacement location. In some embodiments, upon receiving a selection of a replacement location, the service request management module 140 provides instructions to the navigation module 160 to generate navigation instructions to the requestor-selected replacement location. The navigation module 160 generates the instructions and provides the navigation instructions to the provider client device 110 via the provider application 115.

The service request data store 170 maintains a record of in-progress and completed service requests coordinated by the network system 130. More specifically, a service provided by a provider for a requestor is characterized by a set of attributes (or variables), which together form a service request record that is stored in the service request data store 170. The attributes describe aspects of the provider, the requestor, and the service to be provided. In one embodiment, the service request record includes a service request identifier (ID), a requestor ID, a provider ID, at least one service request location, the duration of completing the service request, the service type, estimated time of arrival of the provider at the at least one service request locations, actual time of arrival, and provider rating by requestor, requestor rating by provider, price information, market information, and/or other environmental variables as described below. In some embodiments, the service request record also includes requestor and/or provider feedback regarding the at least one service request location and/or a selected replacement location. The variables for the service request records can thus be drawn from multiple sources, including the requestor's master and usage records in the requestor data store 175, the provider's master and operational records in the provider data store 180, and specific variables captured and received during the service request.

The requestor data store 175 stores account and operational information for requestors who utilizes the network system 130. For a requestor, the requestor data store 175 stores one or more database records associated with the requestor, including both master data and usage data. In some examples, master data for a requestor includes the requestor's name, cell phone number, payment information (e.g., credit card number, account number, etc.), sign-up date, service type preferences, device type (e.g., type of cell phone), platform type (e.g., iOS, Android), application ID, and/or application version for the requestor application 105).

The provider data store 180 stores account and operational information for providers who participates in the network system 130. For a provider, the provider data store 180 stores one or more database records associated with the provider, including both master data and usage data. In some examples, master data for a provider includes the provider's name, driver's license information, insurance information, vehicle information (year, make, model, vehicle ID, license plate), address information, cell phone number, sign-up date, provider service type (regular, luxury, van, etc.), device type (e.g., type of cell phone), platform type (e.g., iOS, Android), application ID, and/or application version for the provider application 115).

The provider inventory data store 185 stores provider availability status information received from the service request management module 140, including whether the provider is available for matching and the location of the provider (which gets updated periodically). When the service request management module 140 receives a service request, the service request management module 140 determines, from the provider inventory data store 185, which providers are potential candidates to provide the service to the requestor for the received service request. When the network system 130 marks a service request record as complete, the network system 130 can add the provider back into the inventory of available providers in the provider inventory data store 185.

The location data store 190 stores historical service data received from the data collection module 150. For example, the location data store 190 stores historical service data associated with the requestor and stores historical service data associated with other users of the network system 130 for every location (service request locations and replacement locations) previously used during the completion of a service request.

Figure 2:
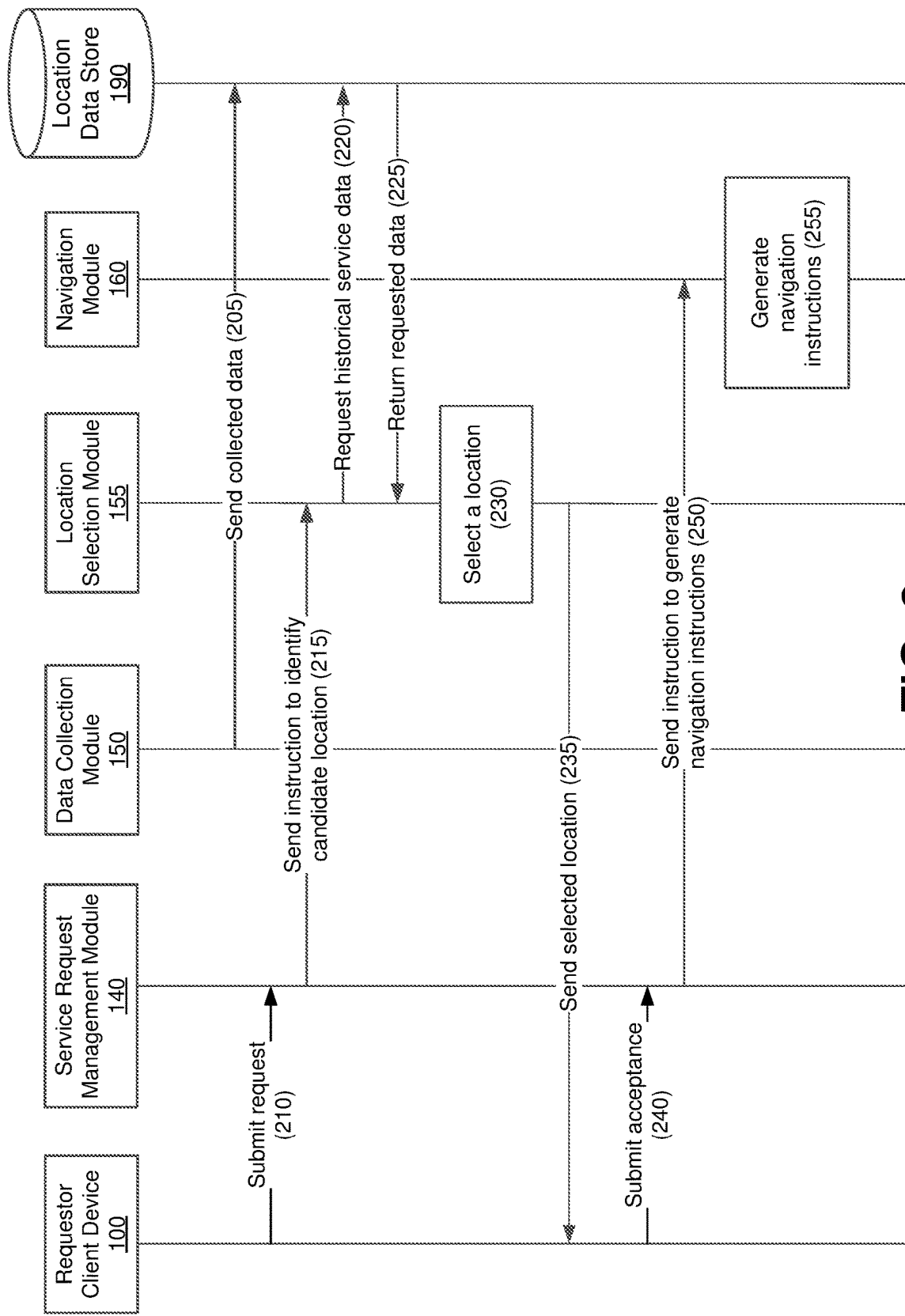
FIG. 2 is an interaction diagram for selecting a location to replace a service request location of a service request, in accordance with an embodiment.

FIG. 2 is an interaction diagram for selecting a location to replace a service request location, in accordance with an embodiment. The data collection module 150 aggregates historical service data associated with the requestor (i.e., a user of the network system 130) and historical service data associated with other users of the network system 130 for use in location selection. In one embodiment, the historical service data is extracted from service request records associated with past service requests. Additionally or alternatively, the data collection module 150 solicits feedback from requestors and providers after a service request is completed and aggregates the received feedback with the historical service data. At 205, the data collection module 150 sends the aggregated data to the location data store 190.

A requestor submits 210 a service request through the requestor application of the requestor client device 100. The service request includes a service to be provided by a provider and at least one service request location (e.g., a destination location). In some embodiments, the service request location may be a location inputted by the requestor or may correspond to the current location of the requestor client device 100. In some embodiments, the service request may also include a service request time (e.g., a time at which the requestor requests the service to be provided by). The service request management module 140 receives the service request and sends 215 an instruction to the location selection module 155 to identify a plurality of candidate locations as possible replacement locations for the service request location.

Responsive to receiving the instruction, the location selection module 155 requests 220 historical service data from the location data store 190 related to particular candidate locations that satisfy certain conditions (e.g., a distance condition or a distance and time condition). For example, the location selection module 155 queries the location data store 190 for historical service data related to candidate locations within a threshold distance of the service request location. In another example, the location selection module 155 queries the location data store 190 for historical service data related to candidate locations within the threshold distance and within a threshold amount of time of the service request time.

The location data store 190 returns 225 the requested data (i.e., historical service data related to candidate locations) to the location selection module 155. In some embodiments, the requested data includes historical service data related to the service request location provided by the requestor in the service request. The location selection module 155 selects 230 a location from the plurality of candidate locations based on predetermined criteria. The predetermined criteria can include a frequency measurement of the candidate location, a recency measurement for the candidate location, a distance measurement between the candidate location and the service request location, an amount of successful service requests that took place at the candidate location, an amount of unsuccessful service requests that took place at the candidate location, or any feedback provided by the requestor and/or the provider associated with the candidate location. In some embodiments, the location selection module 155 ranks the candidate locations based on the predetermined criteria. For example, a candidate location might receive a low ranking if it has a lower frequency of use. In another example, a candidate location might receive a high ranking if it has a high amount of successfully completed service requests taking place at it. The highest-ranked candidate location can be selected 230 to replace the at least one service request location.

At 235, the location selection module 155 sends the selected location to the requester client device 100. The requestor client device 100 submits 240 an acceptance of the selected location through the requestor application 105. The service request management module 140 receives the acceptance and sends 250 instructions to the navigation module 160 to generate 255 navigation instructions for the provider that instruct the provider how to navigate from a current location of the provider to the selected location. In some embodiments, the requestor client device 100 submits a nonacceptance of the selected location. In this embodiment, the service request management module 140 receives the nonacceptance and sends instructions to the navigation module 160 to generate navigation instructions for the provider that instruct the provider how to navigate from a current location of the provider to the service request location provided by the requestor during the service request.

Figure 3:
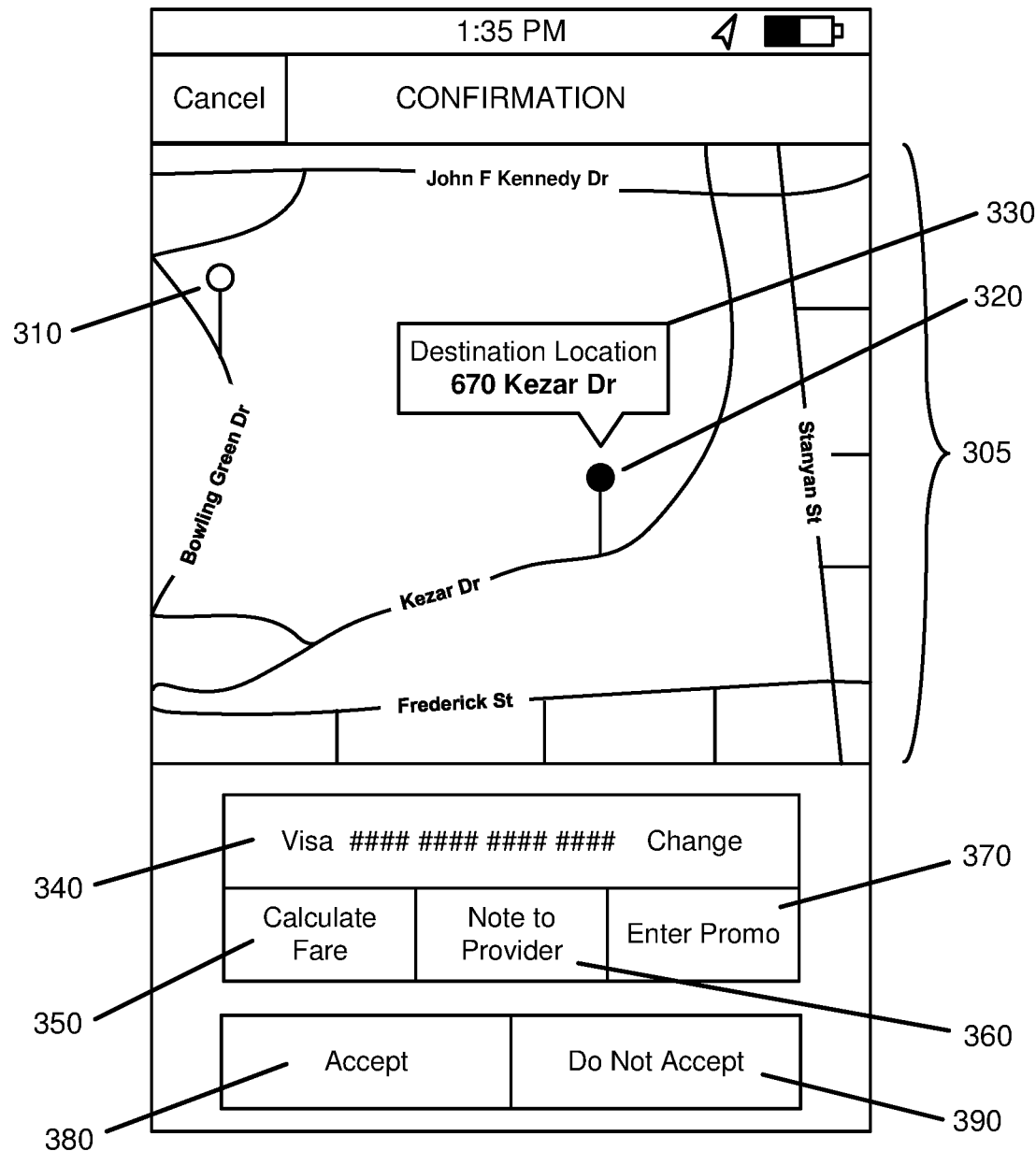
FIG. 3 illustrates an example confirmation user interface displayed to a user to enable the user to accept or not accept a selected location as a replacement for a service request location, in accordance with an embodiment.

FIG. 3 illustrates an example confirmation user interface 300 displayed to a user to enable the user to accept or not accept a selected location as a replacement for a service request location, in accordance with an embodiment. The confirmation user interface 300 is displayed on a user's client device (e.g., the requestor client device 100) via an application (e.g., the requestor application 105).

The confirmation user interface 300 can provide a variety of information that the user can confirm or accept before a network system (e.g., the network system 130) arranges the service for the user. The confirmation user interface 300 can include a map 305 with a service request location graphic pin 310 and a selected location graphic pin 320. A selected location identifier 330 can be provided adjacent to the selected location graphic pin 320. The selected location identifier 330 provides information about the selected location (e.g., an address, a name of a building, a name of a venue, etc.). The confirmation user interface 300 can also provide the user's financial account information 340 (e.g., a bank routing and/or account number, a credit card number, etc.) that is used to pay for the service request. In some variations, the confirmation user interface 300 can also provide selectable features for calculating the price or fare 350, for providing a specific note to the provider 360, and for entering a promotional code to receive a discount on the price of the service request 370.

Once the user views the information provided by the confirmation user interface 300, the user can select a feature to accept 380 or not to accept 390 the selected location. If the user selects to accept 380 the selected location, the provider provides the service at the selected location. If the user selects do not accept 390, the provider provides the service at the service request location originally provided by the user in the service request. If the information provided on the confirmation user interface 300 is incorrect, or the user wishes to cancel the service request for whatever reason, the user can simply select the cancel feature to change the service and/or one or more of the service request locations and/or one or more of the selected locations. In some embodiments to change one or more of the service request locations or one or more of the selected locations, the user can interact directly with the displayed map 305 (e.g., by interacting with the service request location graphic pin 310 and/or the selected location graphic pin 320) of the confirmation user interface 300.

Figure 4:
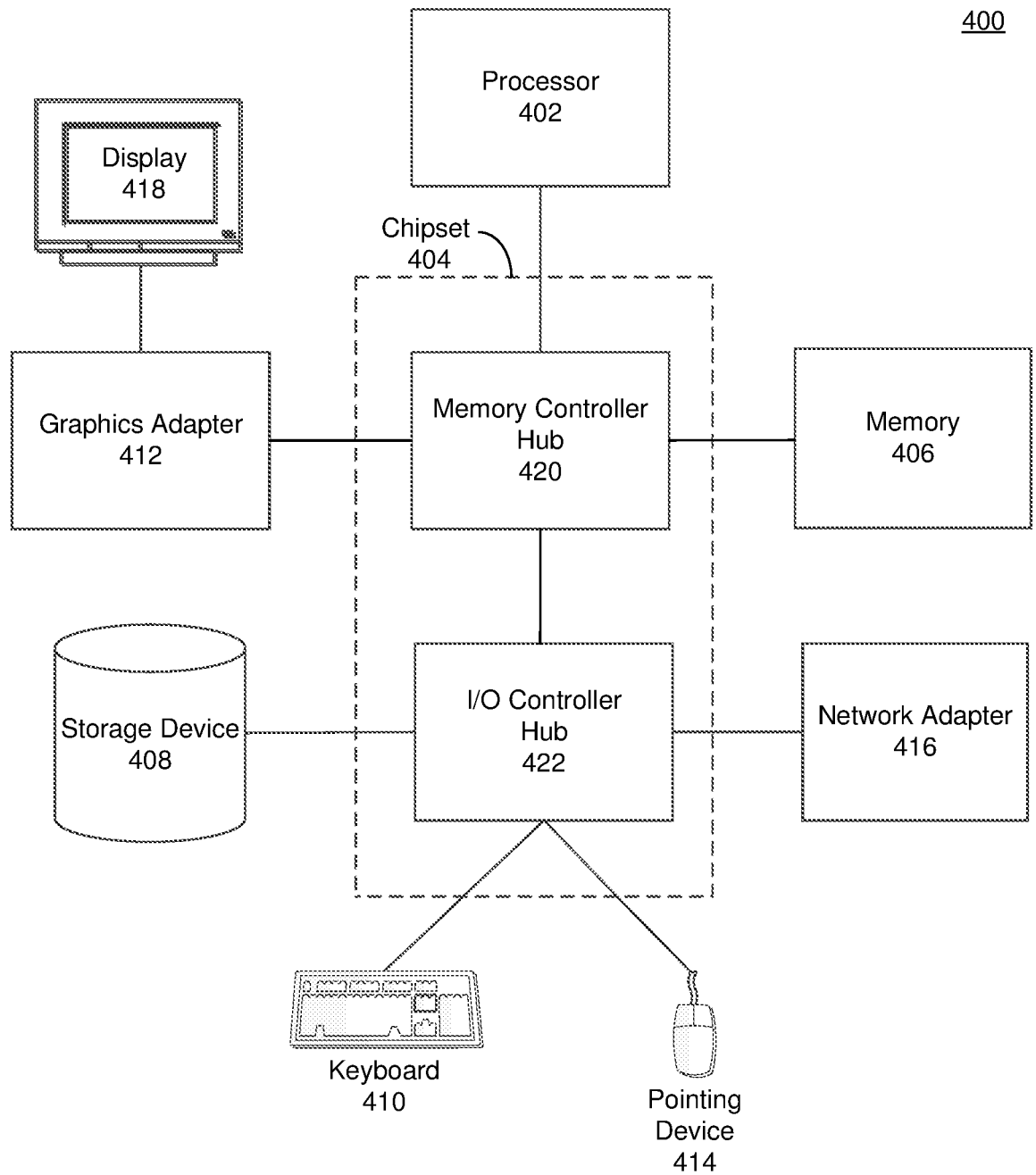
FIG. 4 illustrates example components of a computer used as part or all of the network system, the rider client device, and/or the driver client device, in accordance with an embodiment.

FIG. 4 is a block diagram illustrating physical components of a computer 400 used as part or all of the network system 130, requestor client device 100, or provider client device 110 from FIG. 1, in accordance with an embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400, such as a host or smartphone, may lack a graphics adapter 412, and/or display 418, as well as a keyboard 410 or external pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The foregoing description described one embodiment of the invention in which the network system 130 selects a replacement location based on pre-processed historical service data of the requestor and of other users of the network system 130 and real-time processed service data received from a requestor.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally, computationally, or logically are understood to be implemented by computer programs or equivalent electrical circuits, microcode, or the like. Furthermore, it has also proven convenient at times to refer to these arrangements of operations as modules without loss of generality. The described operations and their associated modules may be embodied in software, firmware, hardware, or any combinations thereof.

Any of the steps, operations, or processes described herein may be performed or implemented with one or more hardware or software modules alone or in combination with other devices. In one embodiment, a software module is implemented with a computer program product comprising a computer-readable storage medium containing instructions which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory computer-readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory computer-readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for providing a service at a location, the method comprising:
   receiving, from a computing device associated with a user, a service request, the service request identifying the service to be provided by a provider and a service request location;
   identifying a plurality of candidate locations using the service request and historical service data for users of a network system;
   selecting a location from the plurality of candidate locations according to predetermined criteria, the predetermined criteria including an amount of successful service requests that take place at each candidate location and an amount of unsuccessful service requests that take place at the service request location according to the historical service data;
   replacing the service request location with the selected location;
   sending the selected location to the computing device;
   receiving, from the computing device, an acceptance of the selected location; and
   responsive to receiving the acceptance, generating navigation instructions for the provider from a current location of the provider to the selected location.

2. The method of claim 1, wherein selecting the location from the plurality of candidate locations according to predetermined criteria comprises ranking the plurality of candidate locations based on the predetermined criteria.

3. The method of claim 2, wherein the predetermined criteria further include a distance measurement between each candidate location and the service request location, and wherein a candidate location associated with a shorter distance measurement between the candidate location and the service request location is associated with a higher rank.

4. The method of claim 1, wherein the predetermined criteria further include a recency measurement of each candidate location.

5. The method of claim 1, wherein the historical service data includes historical service locations, and wherein identifying the plurality of candidate locations comprises:
   determining an amount of distance between the service request location and each historical service location,
   comparing each amount of distance to a threshold distance amount, and
   for each of the historical service locations, identifying the historical service location as a candidate location based on the amount of distance being below the threshold distance amount.

6. The method of claim 5, wherein the service request further includes a request time and the historical service data further includes historical service times associated with each historical service location, and wherein identifying the plurality of candidate locations further comprises:
   determining an amount of time between the request time and each historical service time associated with each candidate location,
   comparing each amount of time to a threshold time amount, and
   updating the plurality of candidate locations based on the amount of time associated with each candidate location being below the threshold time amount.

7. The method of claim 1, wherein the service request is a transportation request, and the service to be provided by the provider is to transport the user to or from the selected location.

8. The method of claim 1, wherein the service request is a delivery request, and the service to be provided by the provider is to transport one or more delivery items to the user at the selected location.

9. A non-transitory computer-readable storage medium comprising instructions that, when executed by a computing system, cause the computing system to perform operations including:
   receiving, from a computing device associated with a user, a service request, the service request identifying a service to be provided by a provider and a service request location;
   identifying a plurality of candidate locations using the service request and historical service data for users of a network system;
   selecting a location from a plurality of candidate locations according to predetermined criteria, the predetermined criteria including an amount of successful service requests that take place at each candidate location and an amount of unsuccessful service requests that take place at the service request location according to the historical service data;
   replacing the service request location with the selected location;
   sending the selected location to the computing device;
   receiving, from the computing device, an acceptance of the selected location; and
   responsive to receiving the acceptance, generating navigation instructions for the provider from a current location of the provider to the selected location.

10. The non-transitory computer-readable storage medium of claim 9, wherein selecting the location from the plurality of candidate locations according to predetermined criteria comprises ranking the plurality of candidate locations based on the predetermined criteria.

11. The non-transitory computer-readable storage medium of claim 10, wherein the predetermined criteria further include a distance measurement between each candidate location and the service request location, and wherein a candidate location associated with a shorter distance measurement between the candidate location and the service request location is associated with a higher rank.

12. The non-transitory computer-readable storage medium of claim 9, wherein the predetermined criteria further include one or more of: a recency measurement of each candidate location.

13. The non-transitory computer-readable storage medium of claim 9, wherein the historical service data includes historical service locations, and wherein identifying the plurality of candidate locations comprises:
   determining an amount of distance between the service request location and each historical service location,
   comparing each amount of distance to a threshold distance amount, and
   for each of the historical service locations, identifying the historical service location as a candidate location based on the amount of distance being below the threshold distance amount.

14. The non-transitory computer-readable storage medium of claim 13, wherein the service request further includes a request time and the historical service data further includes historical service times associated with each historical service location, and wherein identifying the plurality of candidate locations further comprises:
   determining an amount of time between the request time and each historical service time associated with each candidate location,
   comparing each amount of time to a threshold time amount, and
   updating the plurality of candidate locations based on the amount of time associated with each candidate location being below the threshold time amount.

15. A computer system comprising:
   one or more processors; and
   a memory configured to store computer code comprising instructions, the instructions, when executed by the one or more processors, causing the one or more processors to perform steps comprising:
   receiving, from a computing device associated with a user, a service request, the service request identifying a service to be provided by a provider and a service request location;
   identifying a plurality of candidate locations using the service request and historical service data for users of a network system;
   selecting a location from a plurality of candidate locations according to predetermined criteria, the predetermined criteria including an amount of successful service requests that take place at each candidate location and an amount of unsuccessful service requests that take place at the service request location according to the historical service data;
   replacing the service request location with the selected location;

sending the selected location to the computing device;

receiving, from the computing device, an acceptance of the selected location; and responsive to receiving the acceptance, generating navigation instructions for the provider from a current location of the provider to the selected location.

16. The computer system of claim 15, wherein selecting the location from the plurality of candidate locations according to predetermined criteria comprises ranking the plurality of candidate locations based on the predetermined criteria.

17. The computer system of claim 16, wherein the predetermined criteria further include a distance measurement between each candidate location and the service request location, and wherein a candidate location associated with a shorter distance measurement between the candidate location and the service request location is associated with a higher rank.

18. The computer system of claim 15, wherein the predetermined criteria further include a recency measurement of each candidate location.

19. The computer system of claim 15, wherein each of the historical service data includes historical service locations, and wherein identifying the plurality of candidate locations comprises:

determining an amount of distance between the service request location and each historical service location, comparing each amount of distance to a threshold distance amount, and for each of the historical service locations, identifying the historical service location as a candidate location based on the amount of distance being below the threshold distance amount.

20. The computer system of claim 19, wherein the service request further includes a request time and the historical service data further includes historical service times associated with each historical service location, and wherein identifying the plurality of candidate locations further comprises:

determining an amount of time between the request time and each historical service time associated with each candidate location, comparing each amount of time to a threshold time amount, and updating the plurality of candidate locations based on the amount of time associated with each candidate location being below the threshold time amount.

* * * * *